(12) United States Patent
Athad

(10) Patent No.: US 11,806,793 B2
(45) Date of Patent: Nov. 7, 2023

(54) CUTTING INSERT HAVING LATERALLY SPACED APART, LONGITUDINALLY EXTENDING WEDGE ABUTMENT SURFACES, TOOL HOLDER AND CUTTING TOOL

(71) Applicant: ISCAR, LTD., Tefen (IL)

(72) Inventor: Shimon Athad, Maalot (IL)

(73) Assignee: Iscar, Ltd., Tefen (IL)

( * ) Notice: Subject to any disclaimer, the term of this patent is extended or adjusted under 35 U.S.C. 154(b) by 39 days.

(21) Appl. No.: 17/517,711

(22) Filed: Nov. 3, 2021

(65) Prior Publication Data

US 2023/0137637 A1    May 4, 2023

(51) Int. Cl.
| | | |
|---|---|---|
| *B23B 27/04* | (2006.01) | |
| *B23B 29/12* | (2006.01) | |
| *B23B 29/04* | (2006.01) | |

(52) U.S. Cl.
CPC .............. *B23B 29/12* (2013.01); *B23B 27/04* (2013.01); *B23B 29/043* (2013.01); *B23B 2200/088* (2013.01); *B23B 2200/165* (2013.01); *B23C 2210/161* (2013.01)

(58) Field of Classification Search
CPC .............. B23B 27/04; B23B 2200/088; B23B 2200/086; B23B 2200/165; B23B 2200/161
See application file for complete search history.

(56) References Cited

U.S. PATENT DOCUMENTS

| | | |
|---|---|---|
| 3,760,474 A | 9/1973 | Stein |
| 5,676,495 A | 10/1997 | Katbi et al. |
| 5,836,723 A | 11/1998 | Von Haas et al. |
| 5,934,843 A | 8/1999 | Brask et al. |
| 5,975,812 A | 11/1999 | Friedman |

(Continued)

FOREIGN PATENT DOCUMENTS

| | | |
|---|---|---|
| DE | 10 2005 019945 | 11/2006 |
| EP | 3 421 159 A1 | 1/2019 |
| WO | WO 2004/062839 | 7/2004 |

OTHER PUBLICATIONS

International Search Report dated Feb. 8, 2023, issued in PCT counterpart application No. PCT/IL2022/051098.

(Continued)

*Primary Examiner* — Alan Snyder
(74) *Attorney, Agent, or Firm* — Womble Bond Dickinson (US) LLP

(57) ABSTRACT

A cutting tool used for grooving and turning operations where a cutting insert is releasably securable in a tool holder. The cutting insert includes insert upper and lower surfaces, at least one of which includes an insert engagement arrangement having two converging insert engagement wedge surfaces. The tool holder includes an insert receiving slot having a clamping jaw surface and a base jaw lower surface, at least one of which includes a slot engagement arrangement having two converging slot engagement wedge surfaces. When assembled, the cutting insert is releasably clamped in the insert receiving slot. The at least one insert engagement arrangement abuts the at least one slot engagement arrangement only at the insert engagement wedge surfaces and the slot engagement wedge surfaces.

18 Claims, 6 Drawing Sheets

(56) References Cited

U.S. PATENT DOCUMENTS

| | | | |
|---|---|---|---|
| 6,086,291 A * | 7/2000 | Hansson | B23B 27/04 407/111 |
| 6,176,649 B1 | 1/2001 | Friedman | |
| 6,261,032 B1 | 7/2001 | Duwe et al. | |
| 6,273,651 B1 | 8/2001 | Heinloth et al. | |
| 6,428,247 B1 | 8/2002 | Friedman | |
| 6,582,163 B2 | 6/2003 | Hansson et al. | |
| 7,094,006 B2 | 8/2006 | Hecht | |
| 7,419,337 B2 | 9/2008 | Berminge | |
| 7,510,355 B2 | 3/2009 | Havrda | |
| 7,665,933 B2 | 2/2010 | Nagaya et al. | |
| 7,887,267 B2 | 2/2011 | Niemi et al. | |
| 8,366,355 B2 | 2/2013 | Nagaya et al. | |
| 8,449,225 B2 | 5/2013 | Gatt | |
| 8,647,028 B2 | 2/2014 | Athad | |
| 8,647,029 B2 | 2/2014 | Hecht | |
| 8,696,262 B2 | 4/2014 | Hecht | |
| 8,784,014 B2 | 7/2014 | Onodera | |
| 9,033,622 B2 | 5/2015 | Hecht | |
| 9,120,239 B2 | 9/2015 | Hecht | |
| 9,242,300 B2 | 1/2016 | Kaufmann et al. | |
| 2004/0086415 A1 | 5/2004 | Gubanich et al. | |
| 2006/0147281 A1 * | 7/2006 | Nagaya | B23B 29/043 407/117 |
| 2008/0240874 A1 | 10/2008 | Nagaya et al. | |
| 2009/0162154 A1 | 6/2009 | Jonsson et al. | |
| 2009/0285645 A1 | 11/2009 | Hecht | |
| 2010/0119314 A1 | 5/2010 | Nagaya et al. | |
| 2011/0110733 A1 | 5/2011 | Hecht | |
| 2011/0158756 A1 | 6/2011 | Athad | |
| 2011/0255926 A1 | 10/2011 | Hecht | |
| 2013/0058729 A1 | 3/2013 | Choi et al. | |
| 2013/0170917 A1 | 7/2013 | Hecht | |
| 2013/0202372 A1 | 8/2013 | Hecht | |
| 2013/0251465 A1 | 9/2013 | Inoue | |
| 2014/0050542 A1 | 2/2014 | Zeeb et al. | |
| 2014/0072379 A1 | 3/2014 | Hecht | |
| 2014/0133924 A1 | 5/2014 | Oren et al. | |
| 2014/0199128 A1 | 7/2014 | Hecht | |
| 2014/0321926 A1 | 10/2014 | Sadikov | |
| 2014/0348601 A1 | 11/2014 | Hecht | |
| 2015/0063929 A1 | 3/2015 | Hecht | |
| 2015/0224581 A1 | 8/2015 | Tsuda | |
| 2017/0320143 A1 | 11/2017 | Lof | |
| 2017/0333997 A1 | 11/2017 | Kusuda | |
| 2018/0272431 A1 | 9/2018 | Athad | |
| 2019/0160555 A1 | 5/2019 | Hecht et al. | |
| 2020/0298319 A1 | 9/2020 | Hecht et al. | |

OTHER PUBLICATIONS

Written Opinion dated Feb. 8, 2023, issued in PCT counterpart application No. PCT/IL2022/051098.

* cited by examiner

CUTTING INSERT HAVING LATERALLY SPACED APART, LONGITUDINALLY EXTENDING WEDGE ABUTMENT SURFACES, TOOL HOLDER AND CUTTING TOOL

FIELD OF THE INVENTION

The subject matter of the present application relates to grooving and groove-turning cutting tools of the type in which a cutting insert is retained in a tool holder by means of a clamping force.

BACKGROUND OF THE INVENTION

Cutting tools for grooving and groove-turning can be provided with a clamping mechanism for securely retaining a cutting insert within a tool holder.

The tool holder can consist of an insert receiving slot which has a base jaw and clamping jaw where the cutting insert is clamped within the base jaw and clamping jaw.

To improve stability of the cutting insert against lateral cutting forces, the cutting insert can include upper and lower V-shaped ridges. The base jaw and clamping jaw can include V-shaped grooves, respectively, which engage with the V-shaped ridges. Examples of such cutting inserts and tool holders are disclosed in U.S. Pat. Nos. 8,696,262 and 9,120,239. Alternatively, the ridges can be formed on the cutting insert and the grooves can be formed on the tool holder. An example of such a cutting insert and tool holder is disclosed in U.S. Pat. No. 7,887,267.

It is an object of the subject matter of the present application to provide a cutting tool having an improved means of releasably clamping a cutting insert in an insert receiving pocket of a tool holder against lateral cutting forces.

SUMMARY OF THE INVENTION

In accordance with a first aspect of the subject matter of the present application there is provided a cutting tool, comprising:
  a cutting insert, longitudinally elongated in a direction defining an insert longitudinal axis, the cutting insert comprising:
    two opposing insert end surfaces and an insert peripheral surface extending therebetween about the insert longitudinal axis, the insert peripheral surface comprising elongated opposing insert upper and lower surfaces and two opposing insert side surfaces connecting the insert upper and lower surfaces, at least one of the insert end surfaces having an integral cutting portion;
    an insert longitudinal plane containing the insert longitudinal axis and passing midway in-between the two opposing insert side surfaces;
    an insert median plane containing the insert longitudinal axis and passing in-between the insert upper and lower surfaces;
    an insert vertical axis oriented perpendicular to the insert median plane and contained in the insert longitudinal plane;
    an insert lateral axis oriented perpendicular to the insert longitudinal plane and contained in the insert median plane;
    at least one elongated insert engagement arrangement formed on at least one of the insert upper surface and the insert lower surface, the at least one insert engagement arrangement extending longitudinally in a direction between the insert end surfaces along an insert engagement arrangement longitudinal axis;
  wherein:
    the at least one insert engagement arrangement comprises two insert engagement wedge surfaces which extend along the insert engagement arrangement longitudinal axis and which define an acute insert engagement angle by either:
      a) converging outwardly in a direction from the two insert side surfaces so that the insert engagement angle is an internal angle; or
      b) converging inwardly in a direction from the two insert side surfaces so that the insert engagement angle is an external angle; and
    the two insert engagement wedge surfaces each comprise an insert abutment surface, the insert engagement angle defined at each insert abutment surface being greater than or equal to 90° and less than or equal to 110°; and
  a tool holder, comprising a clamping portion having:
    two opposing clamping portion side surfaces and a clamping portion front end surface extending therebetween at a front end of the tool holder;
    an insert receiving slot opening out to the clamping portion front end surface and forming a front slot opening and being longitudinally elongated in a direction defining a slot longitudinal axis, the insert receiving slot comprising:
      an upper clamping jaw comprising a clamping jaw surface; and
      a lower base jaw comprising a base jaw lower surface which faces the clamping jaw surface, the upper clamping jaw being resiliently displaceable relative to the lower base jaw; wherein:
      a slot rear surface extending between the clamping jaw surface and the base jaw lower surface;
      a slot longitudinal plane containing the slot longitudinal axis and intersecting the clamping jaw surface and the base jaw lower surface;
      a slot median plane containing the slot longitudinal axis and passing midway in-between the clamping jaw surface and the base jaw lower surface;
      a slot vertical axis oriented perpendicular to the slot median plane and contained in the slot longitudinal plane;
      a slot lateral axis oriented perpendicular to the slot longitudinal plane and contained in the slot median plane; and
      at least one elongated slot engagement arrangement formed on at least one of the clamping jaw surface and the base jaw lower surface, the at least one slot engagement arrangement extending longitudinally in a direction between the front slot opening and the slot rear surface along a slot engagement arrangement longitudinal axis;
    wherein:
      the at least one elongated slot engagement arrangement comprises two elongated opposing slot engagement wedge surfaces which extend along the slot engagement arrangement longitudinal axis and which define an acute a slot engagement angle by converging in the same outward or inward direction to that of the two insert engagement wedge surfaces, from the two clamping portion side surfaces; and the two slot engagement wedge surfaces each comprise a slot abutment surface, the slot engagement angle defined at each a slot abutment surface being greater than or equal to 90° and less than or equal to 110°;

and wherein:

the cutting insert is releasably clamped between the upper clamping jaw and the lower base jaw; and the at least one insert engagement arrangement abuts the at least one slot engagement arrangement at the insert abutment surfaces and the slot abutment surfaces.

In accordance with a second aspect of the subject matter of the present application there is provided a cutting insert, longitudinally elongated in a direction defining an insert longitudinal axis, comprising:

two opposing insert end surfaces and an insert peripheral surface extending therebetween about the insert longitudinal axis, the insert peripheral surface comprising elongated opposing insert upper and lower surfaces and two opposing insert side surfaces and connecting the insert upper and lower surfaces, at least one of the insert end surfaces having an integral cutting portion;

an insert longitudinal plane containing the insert longitudinal axis and passing midway in-between the two opposing insert side surfaces;

an insert median plane containing the insert longitudinal axis and passing in-between the insert upper and lower surfaces;

an insert vertical axis oriented perpendicular to the insert median plane and contained in the insert longitudinal plane;

an insert lateral axis oriented perpendicular to the insert longitudinal plane and contained in the insert median plane;

at least one elongated insert engagement arrangement formed on at least one of the insert upper surface and the insert lower surface, the at least one insert engagement arrangement extending longitudinally in a direction between the insert end surfaces along an insert engagement arrangement longitudinal axis;

wherein:

the at least one insert engagement arrangement comprises two insert engagement wedge surfaces which extend along the insert engagement arrangement longitudinal axis and which define an acute insert engagement angle by either:

a) converging outwardly in a direction from the two insert side surfaces so that the insert engagement angle is an internal angle; or b) converging inwardly in a direction from the two insert side surfaces so that the insert engagement angle is an external angle;

the two insert engagement wedge surfaces have an insert engagement height measured in a direction of the insert vertical axis, the insert engagement height being less than 0.5 mm;

the two insert engagement wedge surfaces each comprise an insert abutment surface, the insert engagement angle defined at each insert abutment surface being greater than or equal to 90° and less than or equal to 110°; and the two insert engagement wedge surfaces are spaced apart from each other in a lateral direction along the insert lateral axis by an insert engagement lateral distance, the insert engagement lateral distance being greater than five times the insert engagement height.

In accordance with a third aspect of the subject matter of the present application there is provided a tool holder comprising a clamping portion having:

two opposing clamping portion side surfaces and a clamping portion front end surface extending therebetween at a front end of the tool holder; and an insert receiving slot opening out to the clamping portion front end surface and forming a front slot opening and being longitudinally elongated in a direction defining a slot longitudinal axis, the insert receiving slot comprising:

an upper clamping jaw comprising a clamping jaw surface;

a lower base jaw comprising a base jaw lower surface which faces the clamping jaw surface, the upper clamping jaw being resiliently displaceable relative to the lower base jaw;

a slot rear surface extending between the clamping jaw surface and the base jaw lower surface;

a slot longitudinal plane containing the slot longitudinal axis and intersecting the clamping jaw surface and the base jaw lower surface;

a slot median plane containing the slot longitudinal axis and passing midway in-between the clamping jaw surface and the base jaw lower surface;

a slot vertical axis oriented perpendicular to the slot median plane and contained in the slot longitudinal plane;

a slot lateral axis oriented perpendicular to the slot longitudinal plane and contained in the slot median plane; and at least one elongated slot engagement arrangement formed on at least one of the clamping jaw surface and the base jaw lower surface, the at least one slot engagement arrangement extending longitudinally in a direction between the front slot opening and the slot rear surface along a slot engagement arrangement longitudinal axis;

wherein:

the at least one slot engagement arrangement comprises two elongated opposing slot engagement wedge surfaces which extend along the slot engagement arrangement longitudinal axis and which define an acute a slot engagement angle by either:

a) converging outwardly in a direction from the two clamping portion side surfaces so that the slot engagement angle is an external angle; or b) converging inwardly in a direction from the two clamping portion side surfaces so that the slot engagement angle is an internal angle;

the two slot engagement wedge surfaces have a slot engagement height measured in a direction of the slot vertical axis, the slot engagement height being less than 0.5 mm;

the two slot engagement wedge surfaces each comprise a slot abutment surface, the slot engagement angle defined at each slot abutment surface being greater than or equal to 90° and less than or equal to 110°; and the two slot engagement wedge surfaces are spaced apart from each other in a lateral direction along the slot lateral axis by a slot engagement lateral distance, the slot engagement lateral distance being greater than five times the slot engagement height.

In accordance with a fourth aspect of the subject matter of the present application there is provided a cutting tool, comprising:

the cutting insert of the type described above retained in a clamping portion of a tool holder.

It is understood that the above-said is a summary, and that features described hereinafter may be applicable in any combination to the subject matter of the present application, for example, any of the following features may be applicable to the cutting tool, cutting insert or tool holder:

The at least one insert engagement arrangement can abut the at least one slot engagement arrangement only at the insert abutment surfaces and the slot abutment surfaces.

Each insert abutment surface can be planar. Each slot abutment surface can be convexly curved in a cross-sectional view taken in a plane perpendicular to the slot longitudinal axis.

The two insert engagement wedge surfaces can converge outwardly in a direction from the two insert side surfaces so that the insert engagement angle is an internal angle. The two slot engagement wedge surfaces can converge outwardly in a direction from the two clamping portion side surfaces so that the slot engagement angle is an external angle.

The two insert engagement wedge surfaces can have an insert engagement height measured in a direction of the insert vertical axis, the insert engagement height being less than 0.5 mm. The two slot engagement wedge surfaces can have a slot engagement height measured in a direction of the slot vertical axis, the slot engagement height being less than 0.5 mm.

The two insert engagement wedge surfaces can be spaced apart from each other in a lateral direction along the insert lateral axis by an insert engagement lateral distance, the insert engagement lateral distance being greater than five times the insert engagement height. The two slot engagement wedge surfaces can be spaced apart from each other in a lateral direction along the slot lateral axis by a slot engagement lateral distance, the slot engagement lateral distance being greater than five times the slot engagement height.

The cutting insert can comprise first and second insert engagement arrangements, the first insert engagement arrangement formed on the insert upper surface and the second insert engagement arrangement formed on the insert lower surface. The insert receiving slot can comprise first and second slot engagement arrangements, the first slot engagement arrangement formed on the clamping jaw surface and second slot engagement arrangement formed the base jaw lower surface.

The cutting insert can be resiliently clamped between the upper clamping jaw and the lower base jaw.

Each insert abutment surface can be planar.

The two insert engagement wedge surfaces can converge outwardly in a direction from the two insert side surfaces so that the insert engagement angle is an internal angle.

The at least one insert engagement arrangement can comprise an elongated insert engagement projection which extends lengthwise along the insert engagement arrangement longitudinal axis. The insert engagement wedge surfaces can be located on opposite lateral sides of the insert engagement projection.

The at least one insert engagement arrangement can comprise two insert engagement grooves extending lengthwise along opposite lateral sides of the insert engagement projection.

The at least one insert engagement arrangement can comprise exactly one insert engagement projection and exactly two insert engagement grooves.

The at least one insert engagement arrangement can comprise an insert engagement central surface extending between the two insert engagement wedge surfaces, in a direction along the insert lateral axis. The insert engagement central surface can be concavely curved in a view along the insert engagement arrangement longitudinal axis.

The insert engagement central surface can be intersected by the insert longitudinal plane.

The insert engagement angle defined at each insert abutment surface can be greater than or equal to 95° and less than or equal to 100°.

The at least one insert engagement arrangement can be formed on the insert lower surface. On any given side of the insert longitudinal plane, the insert engagement wedge surface can be closer to the insert side surface than to the insert longitudinal plane.

The insert lower surface and the two insert side surfaces can intersect distal the insert end surfaces defining an insert lower plane. The two insert engagement wedge surfaces that are formed on the insert lower surface may not extend beyond the insert lower plane in a direction away from the insert median plane.

The at least one insert engagement arrangement can be formed on the insert upper surface. On any given side of the insert longitudinal plane, the insert engagement wedge surface can be further from the insert side surface than from the insert longitudinal plane.

The insert upper surface and the two insert side surfaces can intersect distal the insert end surfaces defining an insert upper plane. The two insert engagement wedge surfaces that are formed on the insert upper surface may not extend beyond the insert upper plane in a direction away from the insert median plane.

The insert engagement lateral distance can be greater than or equal to 1.5 mm and less than or equal to 2.5 mm.

The cutting insert can comprise first and second insert engagement arrangements, the first insert engagement arrangement formed on the insert upper surface and the second insert engagement arrangement formed on the insert lower surface.

The insert engagement arrangement longitudinal axis can be parallel to the insert longitudinal axis.

The at least one insert engagement arrangement can exhibit mirror symmetry about the insert longitudinal plane.

The at least one insert engagement arrangement can extend from one axial end of the cutting insert to the other axial end, with respect to the insert longitudinal axis.

Each slot abutment surface can be convexly curved in a cross-sectional view taken in a plane perpendicular to the slot longitudinal axis.

The two slot engagement wedge surfaces can converge outwardly in a direction from the two clamping portion side surfaces so that the slot engagement angle is an external angle.

The at least one slot engagement arrangement can comprise a slot engagement groove which extends lengthwise along the slot engagement arrangement longitudinal axis. The slot engagement wedge surfaces can be located on opposite lateral sides of the slot engagement groove.

The at least one slot engagement arrangement can comprise two elongated slot engagement projections extending lengthwise along opposite lateral sides of the slot engagement groove.

The at least one slot engagement arrangement can comprise exactly one slot engagement groove and exactly two slot engagement projections.

The at least one slot engagement arrangement can be formed on the base jaw lower surface. Along their axial extents, the two slot engagement wedge surfaces can each comprise a non-recessed slot engagement portion and a recessed slot engagement portion which extends between the non-recessed slot engagement portion and the clamping portion front end surface, along its axial length, the recessed slot engagement portion being recessed with respect to the non-recessed slot engagement portion. The slot abutment surfaces may not be formed on the recessed slot engagement portion.

The slot engagement arrangement longitudinal axis can be parallel to the slot longitudinal axis.

The at least one slot engagement arrangement can comprise a slot engagement central surface extending between the two slot engagement wedge surfaces. The slot engagement central surface can be planar.

The slot engagement central surface can be intersected by the slot longitudinal plane.

The two slot engagement wedge surfaces can each comprise a slot inclined surface. The slot engagement angle defined at each slot inclined surface can be greater than or equal to 95° and less than or equal to 100°.

On any given side of the slot longitudinal plane, the slot engagement wedge surface can be further from the clamping portion side surface than from the slot longitudinal plane.

The slot engagement lateral distance can be greater than or equal to 1.5 mm and less than or equal to 2.5 mm.

The insert receiving slot can comprise first and second slot engagement arrangements, the first insert receiving slot formed on the clamping jaw surface and the second insert receiving slot formed on the base jaw lower surface.

The at least one slot engagement arrangement can exhibit mirror symmetry about the slot longitudinal plane.

The at least one slot engagement arrangement can extend from one axial end of the insert receiving slot to the other axial end, with respect to the slot longitudinal axis.

BRIEF DESCRIPTION OF THE FIGURES

For a better understanding of the present application and to show how the same may be carried out in practice, reference will now be made to the accompanying drawings, in which.

Figure 1:
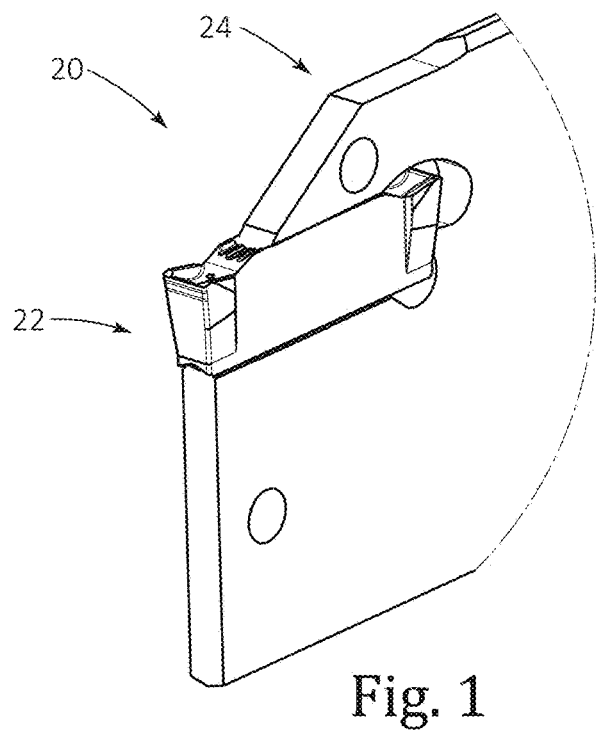
FIG. 1 is a perspective view of a cutting tool in accordance with the present application.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Figure 2:
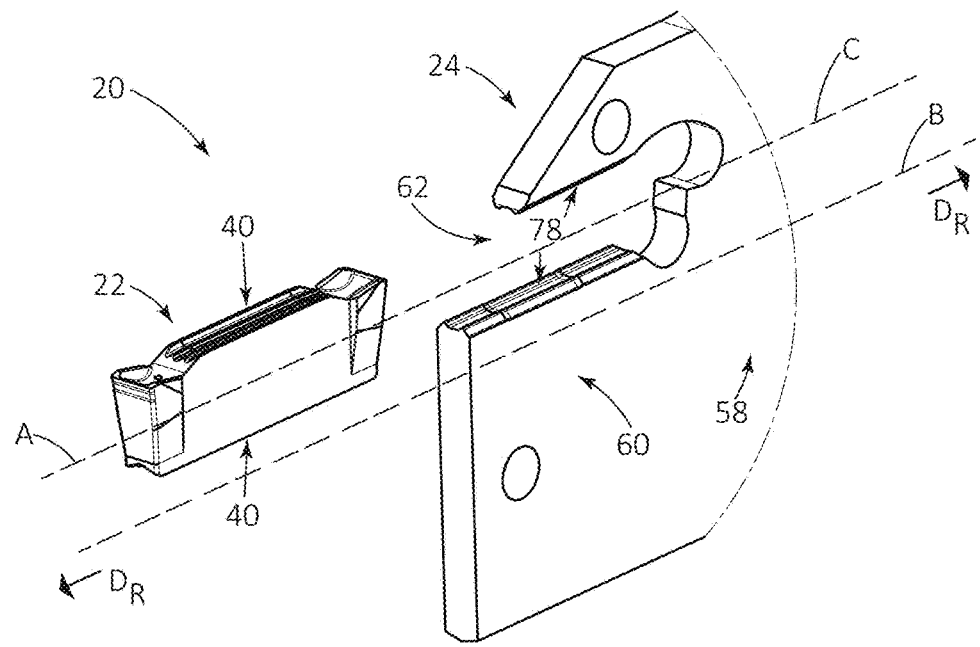
FIG. 2 is an exploded perspective view of the cutting tool shown in FIG. 1.

Attention is first drawn to FIGS. 1 and 2 showing a cutting tool 20, of the type used for grooving or parting, in accordance with some embodiments of the subject matter of the present application. The cutting tool 20 has a cutting insert 22 and a tool holder 24 and the cutting insert 22 is releasably clamped within the tool holder 24.

Figure 3:
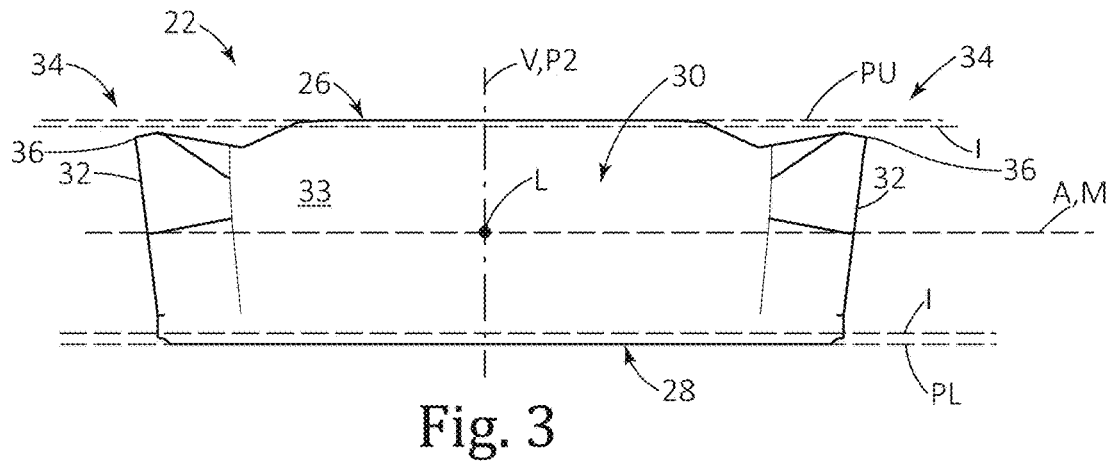
FIG. 3 is a side view of a cutting insert shown in FIG. 2.
Figure 4:
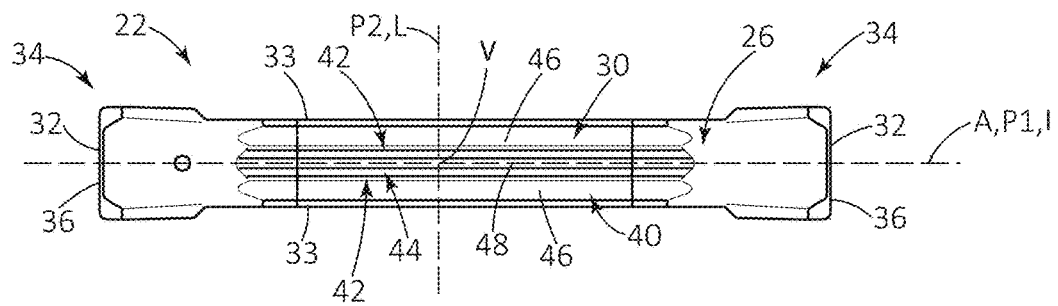
FIG. 4 is a bottom view of the cutting insert shown in FIG. 2.
Figure 5:
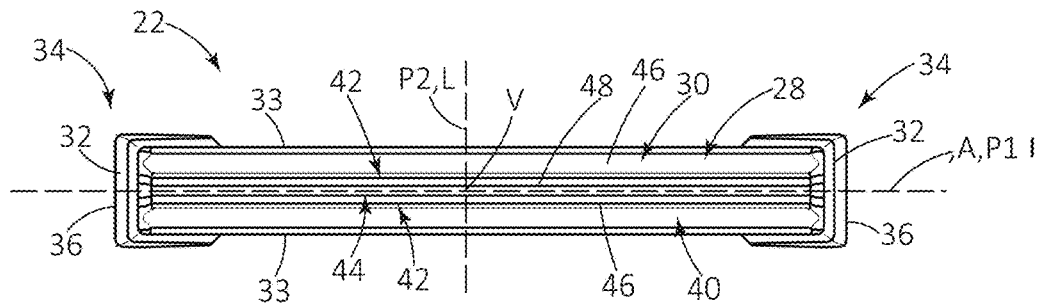
FIG. 5 is a top view of the cutting insert shown in FIG. 2.

Referring now to FIG. 3, the cutting insert 22 has an insert longitudinal axis A and is elongated therealong and in the same direction as the tool holder 24. The cutting insert 22 includes two opposing insert end surfaces 32 and an insert peripheral surface 30 which extends between the two insert end surfaces 32. The insert peripheral surface 30 extends about the insert longitudinal axis A. The insert longitudinal axis A can intersect the two insert end surfaces 32. The insert peripheral surface 30 includes an elongated insert upper surface 26 and an elongated insert lower surface 28 which opposes the elongated insert upper surface 26. The insert peripheral surface 30 includes two opposing insert side surfaces 33 which connect the elongated insert upper and lower surfaces 26, 28 and also connect the two insert end surfaces 32. In contrast to typical turning inserts as shown in US 20170320143A1, for example, the cutting insert 22 is devoid of a through bore, for a clamping member.

Figure 6:
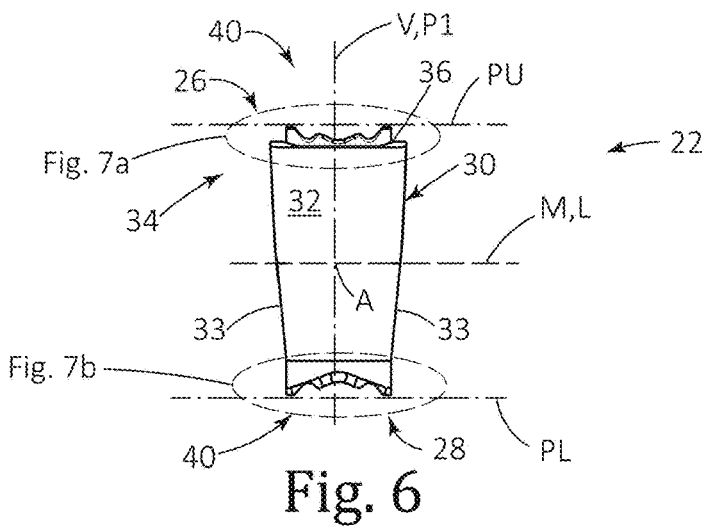
FIG. 6 is an end view of the cutting insert shown in FIG. 2.

Referring to FIGS. 3-6, the cutting insert 22 has an insert longitudinal plane P1 which contains the insert longitudinal axis A and passes midway in-between the insert side surfaces 33. The insert longitudinal plane P1 intersects the insert upper and lower surfaces 26, 28 and the insert end surfaces 32. The cutting insert 22 has an insert median plane M which contains the insert longitudinal axis A and passes midway in-between the insert upper and lower surfaces 26, 28. The insert median plane M intersects the insert end surfaces 32 and the insert side surfaces 33. The cutting insert 22 has an insert vertical axis V oriented perpendicular to the insert median plane M and contained in the insert longitudinal plane P1. The insert vertical axis V intersects the insert upper and lower surfaces 26, 28. The cutting insert 22 has an insert lateral axis L oriented perpendicular to the insert longitudinal plane P1 and contained in the insert median plane M. The insert lateral axis L intersects the insert side surfaces 33. Referring to FIGS. 3 and 6, in accordance with some embodiments of the subject matter of the present application, the insert upper surface 26 and the two insert side surface 33 can intersect distal the insert end surfaces 32 to define an insert upper plane PU. Likewise, the insert lower surface 28 and the two insert side surfaces 33 can intersect distal the insert end surfaces 32 to define an insert lower plane PL. The insert upper and lower planes PU, PL can be parallel to the insert median plane M (and to each other).

Located at, and formed integrally with (i.e., having unitary one-piece construction with), at least one of the end surfaces 32 is a cutting portion 34. The cutting portion 34 can have a cutting edge 36 associated with the insert upper surface 26. In accordance with some embodiments of the subject matter of the present application there can be two cutting portions 34. In such a configuration, the cutting insert 22 can be double-ended and indexable and exhibit mirror symmetry about an insert lateral plane P2, where the insert lateral plane P2 is oriented perpendicular to the insert longitudinal axis A, contains the insert lateral axis L. and passes midway in-between the insert end surfaces 32. Alternatively, one of the cutting portions 34 can be associated with the insert lower surface 28 (not shown), in which case the cutting insert 22, does not exhibit mirror symmetry about the insert lateral plane P2, although it may instead exhibit 180° rotational symmetry about the insert lateral axis I. The cutting insert 22 can be narrower in the widthwise direction (i.e., along the insert lateral axis L) than in the height wise direction (i.e., along the insert vertical axis V).

Referring to FIGS. 4-7b, the cutting insert 22 includes at least one elongated insert engagement arrangement 40 formed on at least one of the insert upper surface 26 and the insert lower surface 28. That is to say, the at least one insert engagement arrangement 40 is formed on the insert upper surface 26 and/or the insert lower surface 28. In accordance with some embodiments of the subject matter of the present application, the cutting insert 22 can include first and second insert engagement arrangements 40, the first formed on the insert upper surface 26 and the second on the insert lower surface 28. That is to say, each of the insert upper and lower surfaces 26, 28 has an insert engagement arrangement 40 formed thereon.

The at least one insert engagement arrangement 40 extends longitudinally in a direction between the insert end surfaces 32 along an insert engagement arrangement longitudinal axis I. In accordance with some embodiments of the subject matter of the present application, the insert engagement arrangement longitudinal axis I can be parallel to (and offset from) the insert longitudinal axis A. The at least one insert engagement arrangement 40 can extend from one axial end of the cutting insert 22 to the other axial end, with respect to the insert longitudinal axis A.

Making reference to FIGS. 4-5 and 7a-7b in particular, in accordance with some embodiments of the subject matter of the present application, the at least one insert engagement arrangement 40 can include an elongated insert engagement projection 42 which extends lengthwise along the insert engagement arrangement longitudinal axis I. The at least one insert engagement arrangement 40 can include two insert engagement grooves 44 which extend lengthwise along opposite lateral sides of the insert engagement projection 42. The two spaced apart insert engagement grooves 44 are preferably spaced apart from another along their entire length, and preferably are parallel to one another. Thus, each insert engagement groove 44 is located between the insert engagement projection 42 and one of the insert side surfaces 33. Preferably, the at least one insert engagement arrangement 40 can include a total of exactly one insert engagement projection 42 and exactly two insert engagement grooves 44, between the opposing insert side surfaces 33.

The at least one insert engagement arrangement 40 includes two elongated opposing insert engagement wedge surfaces 46. One insert engagement wedge surface 46 can be associated with each groove 44. The two insert engagement wedge surfaces 46 extend along the insert engagement arrangement longitudinal axis I. That is to say, the two insert engagement wedge surfaces 46 extend lengthwise in a direction of the insert engagement arrangement longitudinal axis I. The two insert engagement wedge surfaces 46 are located on opposite sides of the insert engagement arrangement longitudinal axis I in a view along the insert vertical axis V. In accordance with some embodiments of the subject matter of the present application the insert engagement wedge surfaces 46 can be located on opposite lateral sides of the insert engagement projection 42.

The two insert engagement wedge surfaces 46 are sloped in a direction towards the insert longitudinal axis A in opposite lateral directions (i.e., in opposite directions along the insert lateral axis L). The two insert engagement wedge surfaces 46 converge towards each other to define an acute insert engagement angle $\theta$. The insert engagement angle $\theta$ is measured in view along the insert longitudinal axis A.

Figure 7A:
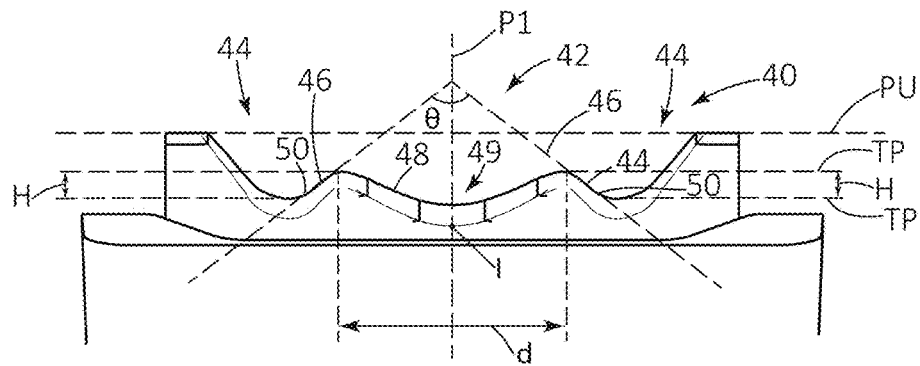
FIG. 7a is a first detail in FIG. 6.
Figure 7B:
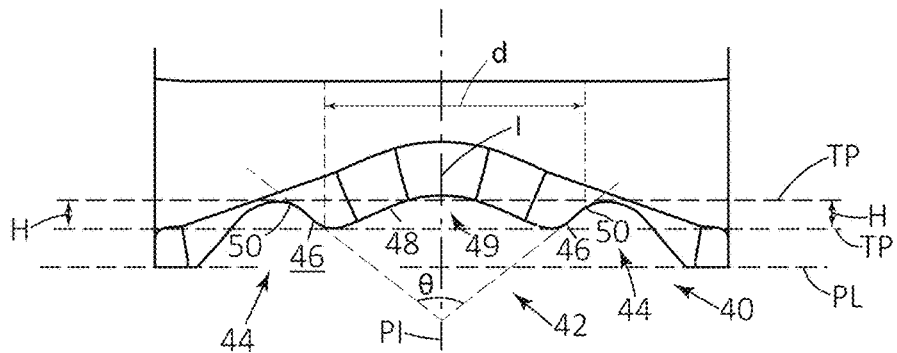
FIG. 7b is a second detail in FIG. 6.

As seen in FIGS. 7a, 7b, in the configuration where the at least one insert engagement arrangement 40 includes the insert engagement projection 42 (i.e., the at least one insert engagement arrangement 40 includes a male member), the two insert engagement wedge surfaces 46 converge outwardly (i.e., away from the insert longitudinal axis A) in a direction from the two insert side surfaces 33 so that the insert engagement angle $\theta$ is an internal angle. In such a case, the two insert engagement wedge surfaces 46 can face away from each other.

Alternatively, the at least one insert engagement arrangement 40 can include a female member. In such a configuration (not shown), the two insert engagement wedge surfaces 46 converge inwardly (i.e., towards the insert longitudinal axis A) in a direction from the two insert side surfaces 33 so that the insert engagement angle $\theta$ is an external angle. The two insert engagement wedge surfaces 46 can face towards each other. The former configuration is preferable. It should be appreciated that throughout the detailed description and claims, an "internal angle" refers to an angle between two surface components of a member surface as measured internal to the member, whereas an "external angle" refers to an angle between two surface components of a member surface as measured external to the member.

Reverting to FIG. 7a, in accordance with some embodiments of the subject matter of the present application, the at least one insert engagement arrangement 40 can be formed on the insert upper surface 26. On any given side of the insert longitudinal plane P1, the insert engagement wedge surface 46 can be further from the insert side surface 33 than from the insert longitudinal plane P1. The two insert engagement wedge surfaces 46 may not extend beyond the insert upper plane PU in a direction away from the insert median plane M. Stated differently, the two insert engagement wedge surfaces 46 are on the same side of the insert upper plane PU as the insert median plane M and the insert longitudinal axis A.

Reverting to FIG. 7b, in accordance with some embodiments of the subject matter of the present application, the at least one insert engagement arrangement 40 can be formed on the insert lower surface 28. On any given side of the insert longitudinal plane P1, the insert engagement wedge surface 46 can be closer to the insert side surface 33 than to the insert longitudinal plane P1. The two insert engagement wedge surfaces 46 that are formed on the insert lower surface 28 may not extend beyond the insert lower plane PL in a direction away from the insert median plane M. Stated differently, the two insert engagement wedge surfaces 46 are on the same side of the insert lower plane PL as the insert median plane M and the insert longitudinal axis A.

In accordance with some embodiments of the subject matter of the present application, in the configuration with two insert engagement arrangements 40 (formed on the insert upper surface 26 and the insert lower surface 28), the two insert engagement wedge surfaces 46 belonging to the first insert engagement arrangement 40 formed on insert upper surface 26 are identical to the two insert engagement wedge surfaces 46 belonging to the second insert engagement arrangement 40 formed on the insert lower surface 28, apart from their axial length. The at least one insert engagement arrangement 40 can exhibit mirror symmetry about the insert longitudinal plane P1.

The two insert engagement wedge surfaces 46 are spaced apart from each other in a lateral direction along the insert lateral axis L by an insert engagement lateral distance d. In accordance with some embodiments of the subject matter of the present application, the insert engagement lateral distance d can be greater than or equal to 1.5 mm and less than or equal to 2.5 mm. Preferably, the insert engagement lateral distance d can be equal to 2.13 mm.

In accordance with some embodiments of the subject matter of the present application, the at least one insert engagement arrangement 40 can include an insert engagement central surface 48 which extends between the two spaced apart insert engagement wedge surfaces 46. That is to say, the two insert engagement wedge surfaces 46 are located on opposite lateral sides of the insert engagement central surface 48. The insert engagement central surface 48 extends lengthwise in a direction along the insert engagement arrangement longitudinal axis I. The insert engagement central surface 48 can be concavely curved in a view along the insert engagement arrangement longitudinal axis I. Thus, the peak of the insert engagement projection 42 can include an elongated insert concavity 49. The insert engagement central surface 48 (and the insert concavity 49) can be intersected by the insert longitudinal plane P1.

Making reference again to FIG. 7a-7b, the two insert engagement wedge surfaces 46 have an insert engagement height H measured in a direction of the insert vertical axis V. The insert engagement height H is greater than 0.1 mm. The insert engagement height H is less than 0.5 mm. Preferably, the insert engagement height H can be equal to 0.2 mm. By virtue of the insert engagement height H being less than 0.5 mm, the two insert engagement projections 42 are less prone to breaking. The insert engagement lateral distance d is greater than five times the insert engagement height H. In accordance with some embodiments of the subject matter of the present application, the insert engagement height H can be measured between two spaced apart insert tangent planes TP oriented parallel to the insert median plane M and which are tangent to each insert engagement wedge surface 46 at its extreme termination points (i.e., the termination points are located where the insert engagement wedge surface 46 changes direction with respect to the insert vertical axis V).

Referring to FIG. 7a-7b, the two insert engagement wedge surfaces 46 each include an insert abutment surface 50, for abutting a corresponding surface on the tool holder's insert receiving slot. In accordance with some embodiments of the subject matter of the present application, each insert abutment surface 50 can be planar.

The insert engagement angle θ defined at each insert abutment surface 50 is greater than or equal to 90° and less than or equal to 110°. When the insert engagement angle θ defined at each insert abutment surface 50 is greater than 110°, the insert abutment surface 50 is prone to slide laterally over a corresponding abutment surface on the insert receiving slot when the cutting insert 22 is subject to lateral cutting forces CF. Preferably, the insert engagement angle θ defined at each insert abutment surface 50 can be greater than or equal to 95° and less than or equal to 100°. Further preferably, the insert engagement angle θ defined at each insert abutment surface 50 can be equal to 98.8°.

Figure 8:
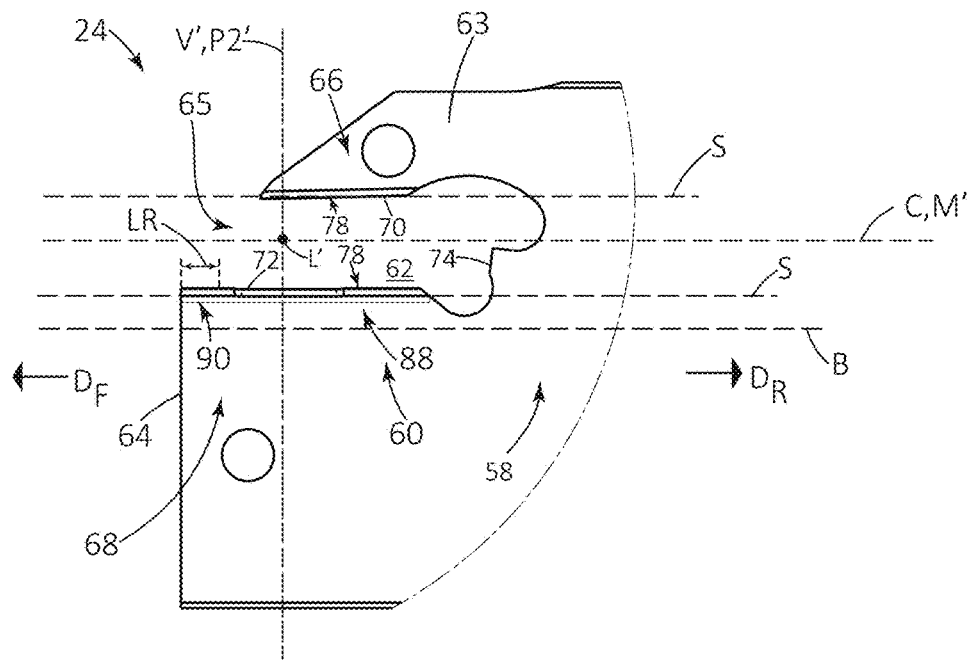
FIG. 8 is a side view of a clamping portion of a tool holder, showing an insert receiving slot shown in FIG. 2.
Figure 11:
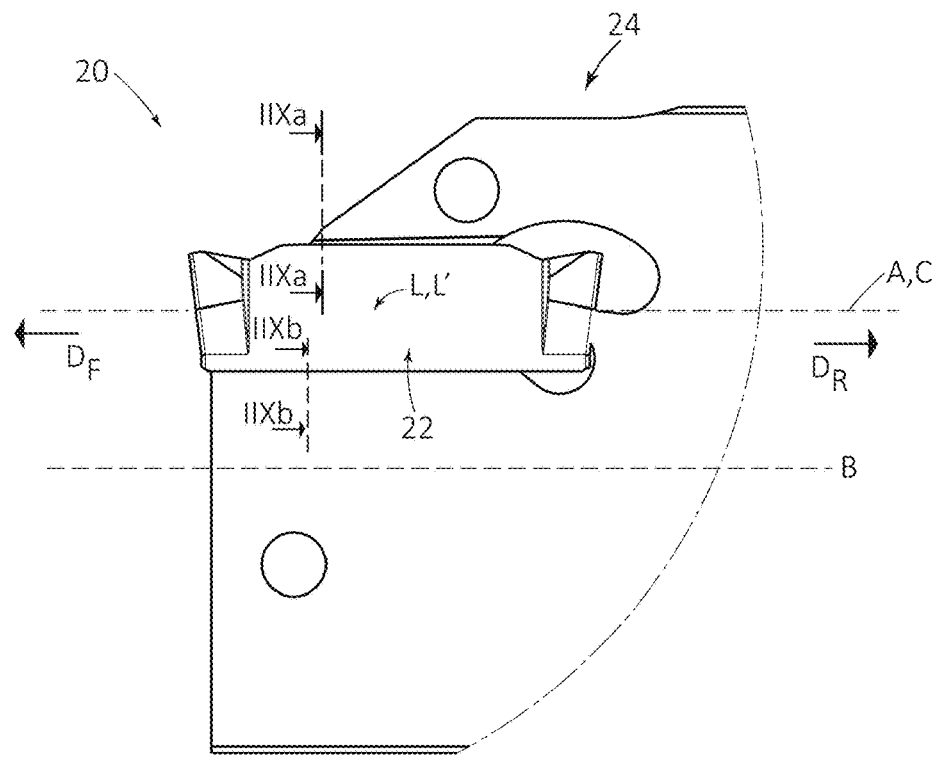
FIG. 11 is a side view of the clamping portion with the cutting insert clamped in the insert receiving slot.

Attention is now drawn to FIG. 8 showing the tool holder 24, for releasably retaining the cutting insert 22 described herein. The tool holder 24 has a holder longitudinal axis B that defines a forward to rearward direction $D_F$, $D_R$. It should be appreciated that use of the terms "forward" and "rearward" throughout the description and claims refer to a relative position in a direction of the holder longitudinal axis B towards the left and right, respectively, in FIGS. 8 and 11. The tool holder 24 has a body portion 58 and a clamping portion 60, located at the forward end of the tool holder 24. The clamping portion 60 can be integrally formed with the body portion 58. The clamping portion 60 includes two opposing clamping portion side surfaces 63 and a clamping portion front end surface 64 extending therebetween at a front end of the clamping portion 60. The clamping portion 60 has an insert receiving slot 62 opening out to the clamping portion front end surface 64 to form a front slot opening 65. The insert receiving slot 62 opens out laterally to the two opposing clamping portion side surfaces 63. The insert receiving slot 62 is longitudinally elongated in a direction defining a slot longitudinal axis C. The insert receiving slot 62 has an upper clamping jaw 66 and a lower base jaw 68, where the upper clamping jaw 66 is resiliently displaceable with respect to the lower base jaw 68. The upper clamping jaw 66 has a clamping jaw surface 70. The lower base jaw 68 has a base jaw lower surface 72. Generally speaking, the clamping jaw surface 70 faces the base jaw lower surface 72. The insert receiving slot 62 includes a slot rear surface 74 which extends between the clamping jaw surface 70 and the base jaw lower surface 72. The slot longitudinal axis C intersects the slot rear surface 74 and passes through the front slot opening 65. A portion of the slot rear surface 74 can serve as an axial stopper. At least the clamping portion 60 is blade-like, so that the tool holder 24 is suitable for grooving and groove-turning operations. In accordance with some embodiments of the subject matter of the present application, the entire tool holder 24 can be a blade (being mountable to a block). The slot longitudinal axis C can be parallel to, and offset from the holder longitudinal axis B.

Figure 9:
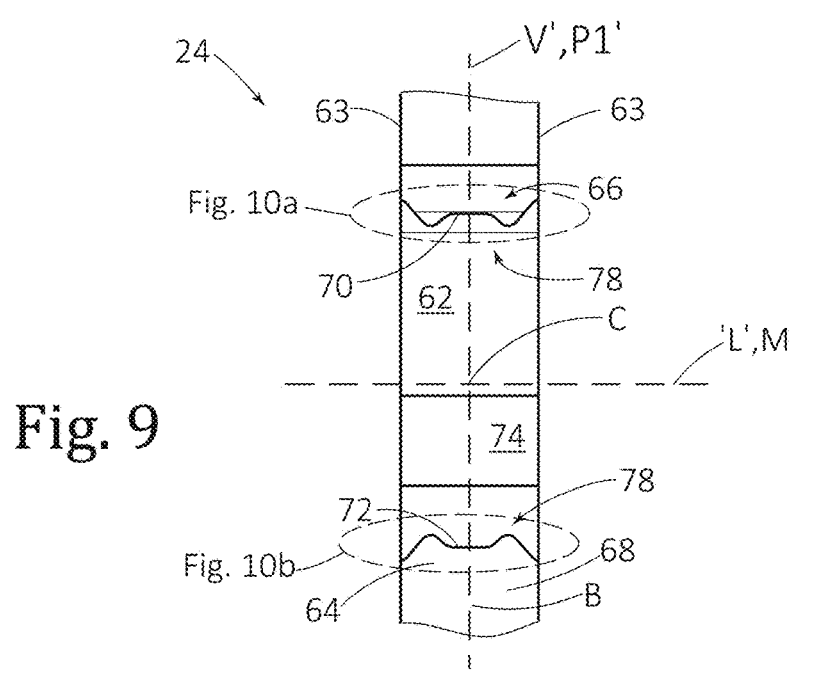
FIG. 9 is an end view of the clamping portion shown in FIG. 8.

Referring to FIGS. 8-9, the insert receiving slot 62 has a slot longitudinal plane P1' which contains the slot longitudinal axis C and intersects the clamping jaw surface 70 and the base jaw lower surface 72. The insert receiving slot 62 has a slot median plane M' which contains the slot longitudinal axis C and passes midway in-between the clamping jaw surface 70 and the base jaw lower surface 72. The insert receiving slot 62 has a slot vertical axis V' oriented perpendicular to the slot median plane M' and contained in the slot longitudinal plane P1'. The slot vertical axis V' intersects the clamping jaw surface 70 and the base jaw lower surface 72. The insert receiving slot 62 has a slot lateral axis L' oriented perpendicular to the slot longitudinal plane P1' and contained in the slot median plane M'. The slot lateral axis L' passes midway in-between the clamping jaw surface 70 and the base jaw lower surface 72. The insert receiving slot 62 has a slot lateral plane P2', where the slot lateral plane P2' is oriented perpendicular to the slot longitudinal axis C, contains the slot lateral axis L', and passes midway in-between the front slot opening 65 and the slot rear surface 74.

Figure 10A:
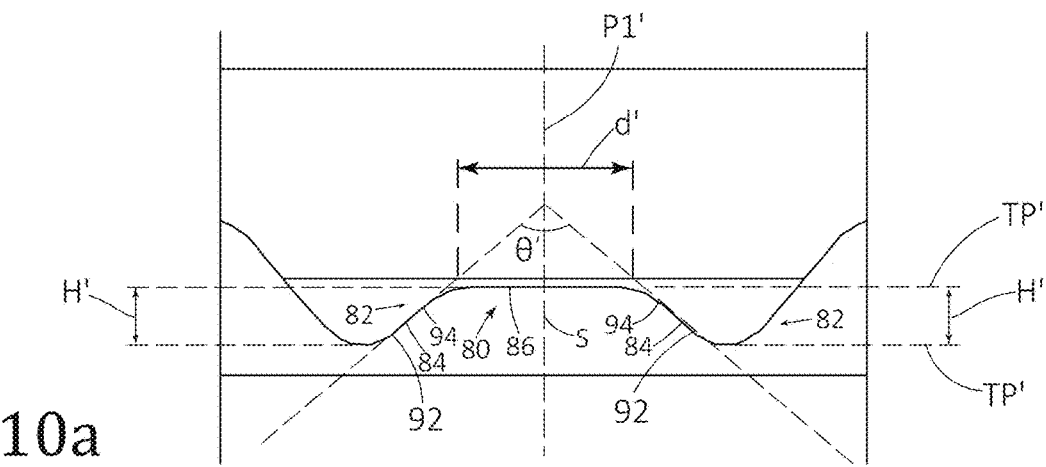
FIG. 10a is a first detail in FIG. 9.
Figure 10B:
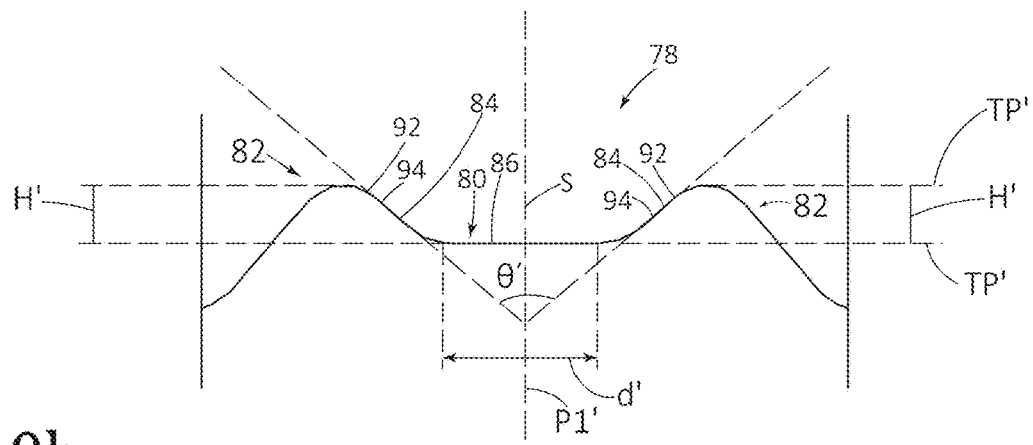
FIG. 10b is a second detail in FIG. 9.

Referring to FIGS. 9 and 10*a*-10*b*, the insert receiving slot 62 includes at least one elongated slot engagement arrangement 78 formed on at least one of the clamping jaw surface 70 and the base jaw lower surface 72. That is to say, the at least one slot engagement arrangement 78 is formed on the clamping jaw surface 70 and/or the base jaw lower surface 72. In accordance with some embodiments of the subject matter of the present application, the insert receiving slot 62 can include first and second slot engagement arrangements 78, a first formed on the clamping jaw surface 70 and a second formed on the base jaw lower surface 72. That is to say, each of the clamping jaw surface 70 and the base jaw lower surface 72 has a slot engagement arrangement 78 formed thereon.

The at least slot engagement arrangement 78 extends longitudinally in a direction between the front slot opening 65 and the slot rear surface 74 along a slot engagement arrangement longitudinal axis S. In accordance with some embodiments of the subject matter of the present application, the at least one slot engagement arrangement 78 can extend from one axial end of the insert receiving slot 62 to the other axial end, with respect to the slot longitudinal axis C. In the configuration with the at least one slot engagement arrangement 78 located at the base jaw lower surface 72, the slot engagement arrangement longitudinal axis S can be parallel to (and offset from) the slot longitudinal axis C.

Making reference to FIGS. 8 and 10*a*-10*b* in particular, in accordance with some embodiments of the subject matter of the present application, the at least one slot engagement arrangement 78 can include a slot engagement groove 80 which extends lengthwise along the slot engagement arrangement longitudinal axis S. The at least one slot engagement arrangement 78 can include two elongated slot engagement projections 82 which extend lengthwise along opposite lateral sides of the slot engagement groove 80. The two spaced apart slot engagement projections 82 are preferably spaced apart from another along their entire length, and preferably are parallel to one another. Thus, each slot engagement projection 82 is located between the slot engagement groove 42 and one of the clamping portion side surfaces 63. Preferably, the at least one slot engagement arrangement 78 can include a total of exactly one slot engagement groove 80 and exactly two slot engagement projections 82 between the opposite sides of the tool holder, e.g., between the two opposing clamping portion side surfaces 63. The two slot engagement projections 82 are rigid. That is to say, the two slot engagement projections 82 are not deformable.

The at least one slot engagement arrangement 78 includes two elongated opposing slot engagement wedge surfaces 84. One slot engagement wedge surface 84 can be associated with each projection 82. The two slot engagement wedge surfaces 84 extend along the slot engagement arrangement longitudinal axis I'. That is to say, the two slot engagement wedge surfaces 84 extend lengthwise in a direction of the slot engagement arrangement longitudinal axis S. The two slot engagement wedge surfaces 84 are located on opposite sides of the slot engagement arrangement longitudinal axis I' in a view along the slot vertical axis V'. In accordance with some embodiments of the subject matter of the present application, the slot engagement wedge surfaces 84 can be located on opposite longitudinal sides of the slot engagement groove 80.

The two slot engagement wedge surfaces 84 are sloped in a direction towards the slot longitudinal axis C in opposite lateral directions (i.e., in opposite directions along the slot lateral axis L'). The two slot engagement wedge surfaces 84 converge towards each other to define a slot engagement angle θ'. The slot engagement angle θ' is measured in a view along the slot longitudinal axis C.

As seen in FIGS. 10*a*, 10*b*, in the configuration where the at least one slot engagement arrangement 78 includes the slot engagement groove 80 (i.e., the at least one slot engagement arrangement 78 includes a female member), the two slot engagement wedge surfaces 84 converge outwardly (i.e., away from the slot longitudinal axis C) in a direction from the two clamping portion side surfaces 63 so that the slot engagement angle θ' is an external angle. In such case, the two slot engagement wedge surfaces 84 can face towards each other.

Alternatively, the at least one slot engagement arrangement 78 can include a male member. In such a configuration (not shown), the two slot engagement wedge surfaces 84 converge inwardly (i.e., towards the slot longitudinal axis C) in a direction from the two clamping portion side surfaces 63 so that the slot engagement angle θ' is an internal angle. In such case, the two slot engagement wedge surfaces 84 can face away from each other. The former configuration is preferable. In accordance with some embodiments of the subject matter of the present application, on any given side of the slot longitudinal plane P1', the slot engagement wedge surface 84 can be further from the clamping portion side surface 63 than from the slot longitudinal plane P1'.

Reverting to FIG. 8, in accordance with some embodiments of the subject matter of the present application, the at least one slot engagement arrangement 78 can be formed on the base jaw lower surface 72. Along their axial extents, the two slot engagement wedge surfaces 84 can each include a non-recessed slot engagement portion 88 and a recessed slot engagement portion 90 which extends between the non-recessed slot engagement portion 88 and the clamping portion front end surface 64. Along its axial length, the recessed slot engagement portion 90 can be recessed with respect to the non-recessed slot engagement portion 88. That is to say, the recessed slot engagement portion 90 is further from the slot longitudinal axis C than the non-recessed slot engagement portion 88. The non-recessed slot engagement portion 88 can be spaced apart from the clamping portion front end surface 64 by the recessed slot engagement portion 90 which has a recessed portion axial length LR (as measured along the slot longitudinal axis C) of no more than 2 mm. The slot abutment surfaces 92 may not be formed on the recessed slot engagement portion 90. Thus, the slot abutment surfaces 92 may be spaced apart from the clamping portion front end surface 64.

In accordance with some embodiments of the subject matter of the present application, in the configuration with two slot engagement arrangements 78, the first formed on the clamping jaw surface 70 and the second formed on the base jaw lower surface 72, the two slot engagement wedge surfaces 84 belonging to the first slot engagement arrangement 78 formed on clamping jaw surface 70 are identical to the two insert engagement wedge surfaces 46 belonging to the second slot engagement arrangement 78 formed on the base jaw lower surface 72, apart from their length. The at least one slot engagement arrangement 78 can exhibit mirror symmetry about the slot longitudinal plane P1'.

Referring to FIGS. 10a-10b, the two slot engagement wedge surfaces 84 are spaced apart from each other in a lateral direction along the slot lateral axis L' by a slot engagement lateral distance d'. The slot engagement lateral distance d' is less than the insert engagement lateral distance d. In accordance with some embodiments of the subject matter of the present application, the slot engagement lateral distance d' can be greater than or equal to 1.5 mm and less than or equal to 2.5 mm. Advantageously, such a configuration allows the slot abutment surfaces (discussed hereafter) to be sufficiently laterally spaced apart so as to provide a stable clamping. Preferably, the slot engagement lateral distance d' can be equal to 1.9 mm.

In accordance with some embodiments of the subject matter of the present application, the at least one slot engagement arrangement 78 can include a slot engagement central surface 86 which extends between the two slot engagement wedge surfaces 84. That is to say, the two slot engagement wedge surfaces 84 are located on opposite lateral sides of the slot engagement central surface 86. The slot engagement central surface 86 can extend lengthwise in a direction of the slot engagement arrangement longitudinal axis S. The slot engagement central surface 86 can be planar. The slot engagement central surface 86 can be intersected by the slot longitudinal plane P1'.

In accordance with some embodiments of the subject matter of the present application, the two slot engagement wedge surfaces 84 each include a slot inclined surface 94. The slot inclined surface 94 can be planar. The slot engagement angle θ' defined at each slot inclined surface 94 can be less than the insert engagement angle θ defined at each insert engagement wedge surface 46. The slot engagement angle θ' defined at each slot inclined surface 94 can be greater than or equal to 90° and less than or equal to 110°. Preferably, the slot engagement angle θ' defined at each slot inclined surface 94 can be greater than or equal to 92.5° and less than or equal to 97.5°. Further preferably, the slot engagement angle θ' defined at each slot inclined surface 94 can be equal to 94°.

Making reference again to FIG. 10a-10b, the two slot engagement wedge surfaces 84 have a slot engagement height H' measured in a direction of the slot vertical axis V'. The slot engagement height H' is greater than 0.1 mm. The slot engagement height H' is less than 0.5 mm. Preferably, the slot engagement height H' can be equal to 0.28 mm. By virtue of the slot engagement height H' being less than 0.5 mm, the two slot engagement projections 82 are rigid. That is to say, the two slot engagement projections 82 are not deformable. The slot engagement lateral distance d' is greater than five times the slot engagement height H'. In accordance with some embodiments of the subject matter of the present application, the slot engagement height H' can be measured between two spaced apart slot tangent planes TP' oriented parallel to the slot median plane M' and which are tangent to each slot engagement wedge surface 84 at its extreme termination points (i.e., the termination points are located where the slot engagement wedge surface 84 changes direction with respect to the slot vertical axis V'). The slot engagement height H' can be greater than the insert engagement height H.

Figure 12A:
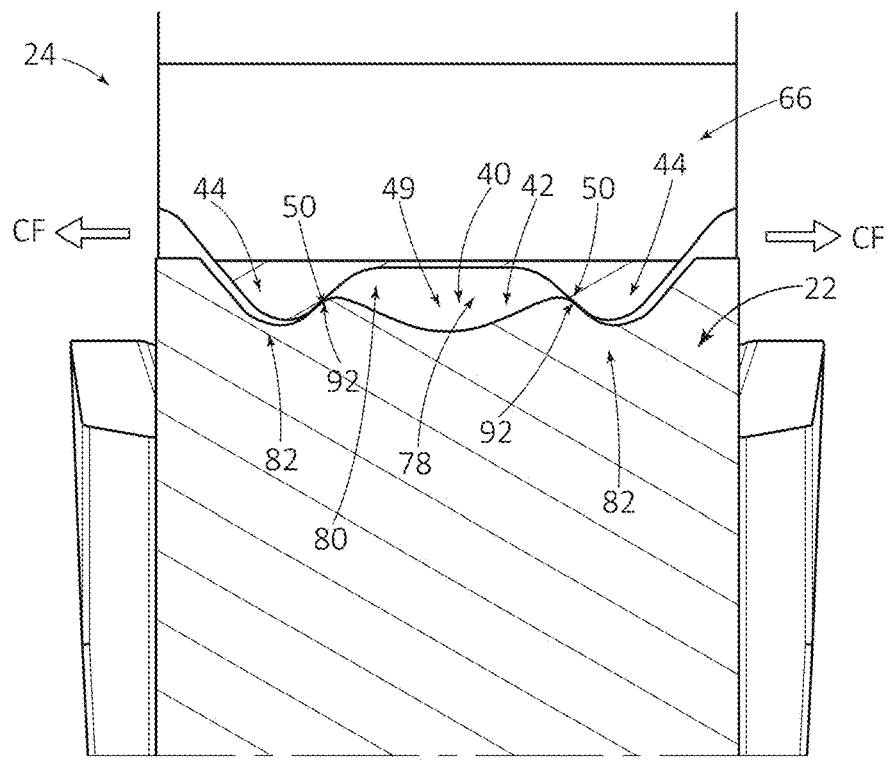
FIG. 12a is a cross-sectional view of the cutting tool taken along line XIIa-XIIa in FIG. 11.
Figure 12B:
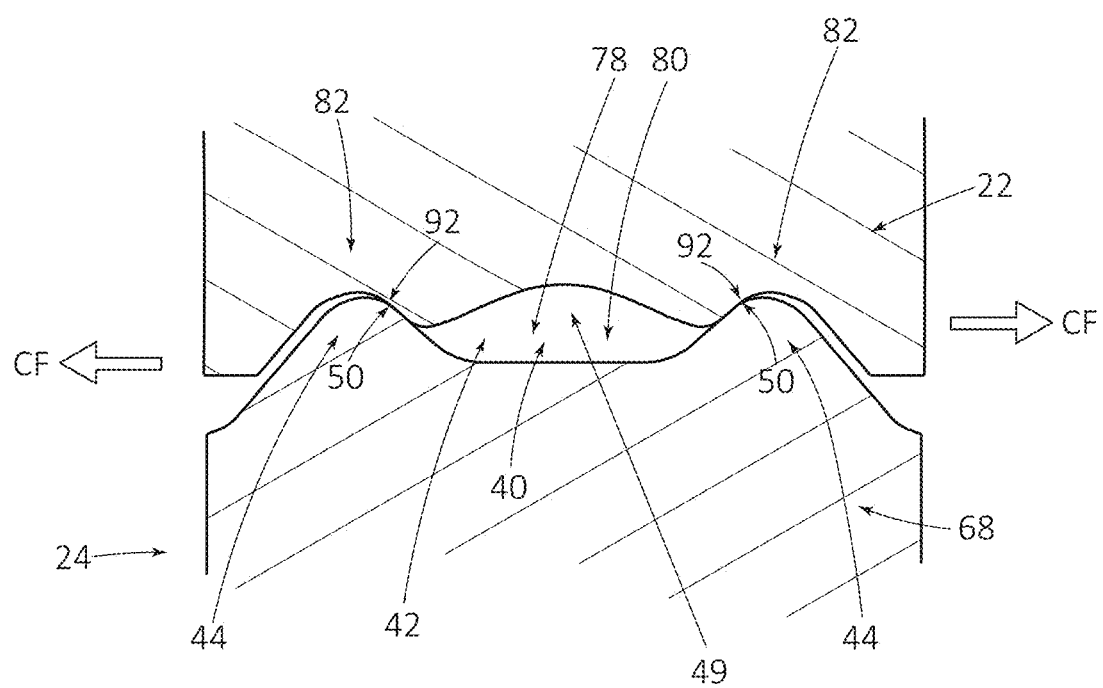
FIG. 12b is a cross-sectional view of the cutting tool taken along line XIIb-XIIb in FIG. 11.

Referring to FIGS. 10a-10b, the two slot engagement wedge surfaces 84 each include a slot abutment surface 92, for abutting a corresponding surface on the cutting insert 22. In accordance with some embodiments of the subject matter of the present application, each slot abutment surface 92 can transition into a respective, adjacent slot inclined surface 94. Each slot abutment surface 92 can be convexly curved in a cross-sectional view taken in a plane perpendicular to the slot longitudinal axis C (i.e., as shown in FIGS. 12a-12b).

The slot engagement angle θ' defined at each slot abutment surface 92 can be greater than or equal to 90° and less than or equal to 110°. When the slot engagement angle θ' defined at each slot abutment surface 92 is greater than 110°, the insert abutment surface 50 is prone to slide laterally over the slot abutment surface 92 when the cutting insert is subject to lateral cutting forces CF. Preferably, the slot engagement angle θ' defined at each slot abutment surface 92 can be greater than or equal to 95° and less than or equal to 100°.

Referring back to FIGS. 1 and 2, the cutting tool 20 has the cutting insert 22 releasably clamped between the upper clamping jaw 66 and the lower base jaw 68. In accordance with some embodiments of the subject matter of the present application, the cutting insert 22 can be resiliently clamped between the upper clamping jaw 66 and the lower base jaw 68.

Each insert engagement arrangement 40 engages with a corresponding slot engagement arrangement 78. The two slot engagement wedge surfaces 84 converge in the same outward or inward direction to that of the two insert engagement wedge surfaces 46, from the two clamping portion side surfaces 63. That is to say, when the two insert engagement wedge surfaces 46 converge outwardly in a direction from the two insert side surfaces 33, the two slot engagement wedge surfaces 84 converge outwardly in a direction from the two clamping portion side surfaces 63. Likewise, when the two insert engagement wedge surfaces 46 converge inwardly in a direction from the two insert side surfaces 33, the two slot engagement wedge surfaces 84 converge inwardly in a direction from the two clamping portion side surfaces 63. It is noted that when the insert engagement angle θ is an internal angle, the slot engagement angle θ' is an external angle, and vice versa. In accordance with some embodiments of the subject matter of the present application, referring to also FIGS. 11-12b, the insert engagement projection 42 can be located in the slot engagement groove 80. In accordance with some embodiments of the subject matter of the present application, the insert engagement grooves 44 can be located in the slot engagement projections 82. The insert concavity 49 can be unoccupied.

The at least one insert engagement arrangement 40 abuts the at least one slot engagement arrangement 78 at the insert abutment surface 50 and the slot abutment surface 92. Such a configuration provides improved stability of the cutting insert 22 in the insert receiving slot 62 against lateral cutting forces CF (i.e., in the direction of the slot lateral axis L'). In accordance with some embodiments of the subject matter of the present application, the at least one insert engagement arrangement 40 can abut the at least one slot engagement arrangement 78 only at the insert abutment surfaces 50 and the slot abutment surfaces 92. That is to say, the remainder of the at least one insert engagement arrangement 40 can be spaced apart from the remainder of the at least one slot engagement arrangement 78. Likewise, it is noted that, the remainder of the insert upper surface 26 and/or insert lower surface 28 that are not part of an insert engagement arrangement 40 can be spaced apart from remainder of the clamping jaw surface 70 and/or base jaw lower surface 72 that are not part of a slot engagement arrangement 78. In particular, it is further noted that the slot inclined surface 94 may not be in contact with the at least one insert engagement arrangement 40. It is yet further noted that a common interface between the at least one insert engagement arrangement 40 and the at least one slot engagement arrangement 78 may not include serrations having a series of alternating troughs and crests which inter-engage with each other, as disclosed in, for example, WO 2004/062839, and potentially result in an over-determined arrangement having unstable seating.

Although the subject matter of the present application has been described to a certain degree of particularity, it should be understood that various alterations and modifications could be made without departing from the spirit or scope of the invention as hereinafter claimed. For example, the insert engagement wedge surfaces 46 and/or the slot engagement wedge surfaces 84 can include two component surfaces which are axially spaced apart by a cut-out (i.e., recessed) portion, as disclosed in for example, U.S. Pat. No. 9,033,622.

What is claimed is:

1. A cutting insert (22), longitudinally elongated in a direction defining an insert longitudinal axis (A), comprising:
   two opposing insert end surfaces (32) and an insert peripheral surface (30) extending therebetween about the insert longitudinal axis (A), the insert peripheral surface (30) comprising elongated opposing insert upper and lower surfaces (26, 28) and two opposing insert side surfaces (33) and connecting the insert upper and lower surfaces (26, 28), at least one of the insert end surfaces (32) having an integral cutting portion (34);
   an insert longitudinal plane (P1) containing the insert longitudinal axis (A) and passing midway in-between the two opposing insert side surfaces (33);
   an insert median plane (M) containing the insert longitudinal axis (A) and passing in-between the insert upper and lower surfaces (26, 28);
   an insert vertical axis (V) oriented perpendicular to the insert median plane (M) and contained in the insert longitudinal plane (P1);
   an insert lateral axis (L) oriented perpendicular to the insert longitudinal plane (P1) and contained in the insert median plane (M);
   at least one elongated insert engagement arrangement (40) formed on at least one of the insert upper surface (26) and the insert lower surface (28), the at least one insert engagement arrangement (40) extending longitudinally in a direction between the insert end surfaces (32) along an insert engagement arrangement longitudinal axis (I);
   wherein:
      the at least one insert engagement arrangement (40) comprises:
         an elongated insert engagement projection (42) which extends lengthwise along the insert engagement arrangement longitudinal axis (I), the insert engagement wedge surfaces (46) being located on opposite lateral sides of the insert engagement projection (42);
         two insert engagement grooves (44) extending lengthwise along opposite lateral sides of the insert engagement projection (42); and
         two insert engagement wedge surfaces (46) which extend along the insert engagement arrangement longitudinal axis (I) and which define an insert engagement angle (θ) by either:
            a) converging outwardly in a direction from the two insert side surfaces (33) so that the insert engagement angle (θ) is an internal angle; or
            b) converging inwardly in a direction from the two insert side surfaces (33) so that the insert engagement angle (0) is an external angle;
      the two insert engagement wedge surfaces (46) have an insert engagement height (H) measured in a direction of the insert vertical axis (V), the insert engagement height (H) being less than 0.5 mm;
      the two insert engagement wedge surfaces (46) each comprise an insert abutment surface (50), the insert engagement angle (θ) being defined between the insert abutment surfaces (50) and being greater than or equal to 90° and less than or equal to 110°; and
      the two insert engagement wedge surfaces (46) are spaced apart from each other in a lateral direction along the insert lateral axis (L) by an insert engagement lateral distance (d), the insert engagement lateral distance (d) being greater than five times the insert engagement height (H).

2. The cutting insert (22), according to claim 1, wherein each insert abutment surface (50) is planar.

3. The cutting insert (22), according to claim 1, wherein the two insert engagement wedge surfaces (46) converge outwardly in a direction from the two insert side surfaces (33) so that the insert engagement angle (θ) is an internal angle.

4. The cutting insert (22), according to claim 1, wherein the at least one insert engagement arrangement (40) comprises exactly one insert engagement projection (42) and exactly two insert engagement grooves (44).

5. The cutting insert (22), according to claim 1, wherein:
   the at least one insert engagement arrangement (40) comprises an insert engagement central surface (48) extending between the two insert engagement wedge surfaces (46), in a direction along the insert lateral axis (L); and
   the insert engagement central surface (48) is concavely curved in a view along the insert engagement arrangement longitudinal axis (I).

6. The cutting insert (22), according to claim 5, wherein the insert engagement central surface (48) is intersected by the insert longitudinal plane (P1).

7. The cutting insert (22), according to claim 1, wherein the insert engagement angle (θ) defined between the insert abutment surfaces (50) is greater than or equal to 95° and less than or equal to 100°.

8. The cutting insert (22), according to claim 1, wherein:
   the at least one insert engagement arrangement (40) is formed on the insert lower surface (28); and
   on any given side of the insert longitudinal plane (P1), the insert engagement wedge surface (46) is closer to the insert side surface (33) than to the insert longitudinal plane (P1).

9. The cutting insert (22), according to claim 8, wherein:
   the insert lower surface (28) and the two insert side surfaces (33) intersect distal the insert end surfaces (32) defining an insert lower plane (PL); and
   the two insert engagement wedge surfaces (46) that are formed on the insert lower surface (28) do not extend beyond the insert lower plane (PL) in a direction away from the insert median plane (M).

10. The cutting insert (22), according to claim 1, wherein:
    the at least one insert engagement arrangement (40) is formed on the insert upper surface (26); and
    on any given side of the insert longitudinal plane (P1), the insert engagement wedge surface (46) is further from the insert side surface (33) than from the insert longitudinal plane (P1).

11. The cutting insert (22), according to claim 10, wherein:

the insert upper surface (26) and the two insert side surfaces (33) intersect distal the insert end surfaces (32) defining an insert upper plane (PU); and the two insert engagement wedge surfaces (46) that are formed on the insert upper surface (26) do not extend beyond the insert upper plane (PU) in a direction away from the insert median plane (M).

12. The cutting insert (22), according to claim 1, wherein the insert engagement lateral distance (d) is greater than or equal to 1.5 mm and less than or equal to 2.5 mm.

13. The cutting insert (22), according to claim 1, wherein the cutting insert (22) comprises first and second insert engagement arrangements (40), the first insert engagement arrangement formed on the insert upper surface (26) and the second insert engagement arrangement formed on the insert lower surface (28).

14. The cutting insert (22), according to claim 1, wherein the insert engagement arrangement longitudinal axis (I) is parallel to the insert longitudinal axis (A).

15. The cutting insert (22), according to claim 1, wherein the at least one insert engagement arrangement (40) exhibits mirror symmetry about the insert longitudinal plane (P1).

16. The cutting insert (22), according to claim 1, wherein the at least one insert engagement arrangement (40) extends from one axial end of the cutting insert (22) to the other axial end, with respect to the insert longitudinal axis (A).

17. A cutting tool (20), comprising:
the cutting insert (22) of claim 1 retained in a clamping portion (60) of a tool holder (24).

18. The cutting tool (20) according to claim 17, wherein:
the clamping portion (60) comprises:
   two opposing clamping portion side surfaces (63) and a clamping portion front end surface (64) extending therebetween at a front end of the tool holder;
   an insert receiving slot (62) opening out to a clamping portion front end surface (64) forming a front slot opening (65) and being longitudinally elongated in a direction defining a slot longitudinal axis (C), the insert receiving slot (62) comprising:
      an upper clamping jaw (66) comprising a clamping jaw surface (70); and
      a lower base jaw (68) comprising a base jaw lower surface (72) which faces the clamping jaw surface (70), the upper clamping jaw (66) being resiliently displaceable relative to the lower base jaw (68);
   wherein:
      a slot rear surface (74) extending between the clamping jaw surface (70) and the base jaw lower surface (72);
      a slot longitudinal plane (P1') containing the slot longitudinal axis (C) and intersecting the clamping jaw surface (70) and the base jaw lower surface (72);
      a slot median plane (M') containing the slot longitudinal axis (C) and passing midway in-between the clamping jaw surface (70) and the base jaw lower surface (72);
      a slot vertical axis (V') oriented perpendicular to the slot median plane (M') and contained in the slot longitudinal plane (P1');
      a slot lateral axis (L') oriented perpendicular to the slot longitudinal plane (P1') and contained in the slot median plane (M'); and
      at least one elongated slot engagement arrangement (78) formed on at least one of the clamping jaw surface (70) and the base jaw lower surface (72), the at least one slot engagement arrangement (78) extending longitudinally in a direction between the front slot opening (65) and the slot rear surface (74) along a slot engagement arrangement longitudinal axis (S);
   wherein:
      the at least one slot engagement arrangement (78) comprises two elongated opposing slot engagement wedge surfaces (84) which extend along the slot engagement arrangement longitudinal axis (I') and which define a slot engagement angle (θ') by converging in the same outward or inward direction to that of the two insert engagement wedge surfaces (46), from the two clamping portion side surfaces (63); and
      the two slot engagement wedge surfaces (84) each comprise a slot abutment surface (92), the slot engagement angle (θ') being defined between the slot abutment surfaces (92) and being greater than or equal to 90° and less than or equal to 110°;
   the cutting insert (22) is releasably clamped between the upper clamping jaw (66) and the lower base jaw (68); and
   the at least one insert engagement arrangement (40) abuts the at least one slot engagement arrangement (78) at the insert abutment surfaces (50) and the slot abutment surfaces (92).

\* \* \* \* \*